United States Patent Office 3,493,079
Patented Feb. 3, 1970

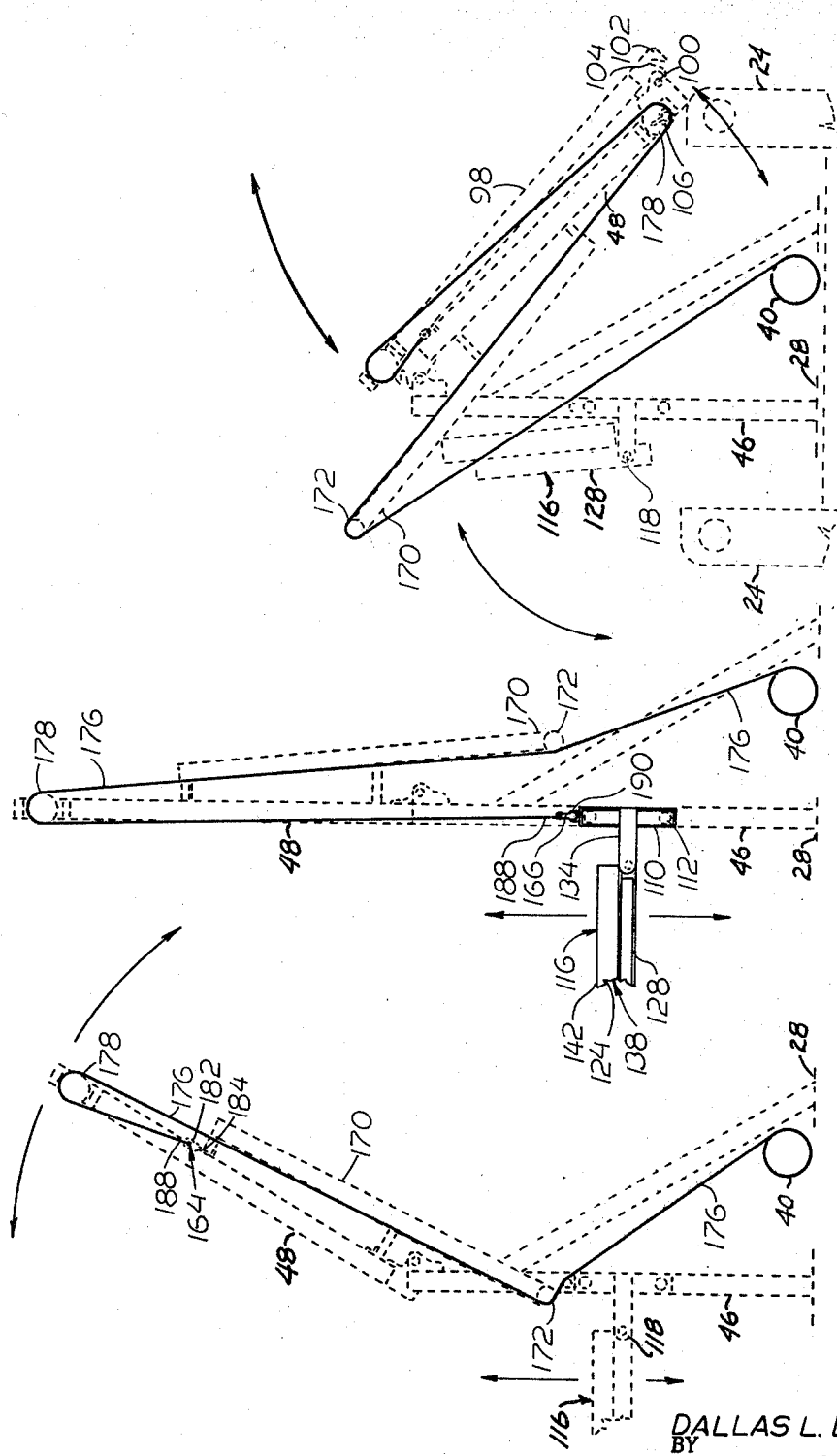

3,493,079
FOLDABLE, ADJUSTABLE HEIGHT PLATFORM
ASSEMBLY MOUNTABLE ON A VEHICLE
Dallas L. Dudschus, 149 Harvard,
Fircrest, Wash. 98466
Filed Dec. 18, 1967, Ser. No. 691,417
Int. Cl. E04g 1/18, 1/34; E06c 5/04
U.S. Cl. 182—141                    5 Claims

ABSTRACT OF THE DISCLOSURE

An adjustable height platform is moved as its immediate supports are guided up and down an upright guiding structure which is secured to a base mountable on load carrying structure of a vehicle. The platform is pivotally mounted and also portions of the upright guiding structure are pivotally mounted so that the overall dimensions of the assembly can be reduced during movement of the vehicle. Powered mechanisms are used to pivot portions of the upright guiding structure and to raise and lower the platform.

BACKGROUND OF INVENTION

This invention provides persons with foldable adjustable height platform equipment mountable on vehicles enabling them to move such mounted equipment, when folded, over roads to a designated location where it can be quickly unfolded and placed in operation raising them to selected heights to accomplish their respective purposes, such as painting, window washing, building construction, electrical wiring, tree trimming, TV camera operations, furniture moving, etc. Although this adjustable height platform equipment or assembly is mounted anywhere, it is particularly suited for removable mounting on the loading carrying structure of a pick up truck.

Other equipment available utilizes different structural arrangements and is more complex, consequently not being as readily adaptable to quick mounting on a standard vehicle such as a pick up truck.

SUMMARY OF THE INVENTION

A person, singly or with others, moves conveniently through city street or over highways with this foldable adjustable height platform assembly or equipment mounted on a vehicle. On arriving at a destination, the platform is easily pivoted to a substantially horizontal position so the person may work from one side of the vehicle. When so pivoted the platform is readily raised up and down along uprights which in part have been quickly pivoted upwardly from their folded travel position. A powered mechanism is used to pivot upright portions and to move the platform.

DRAWINGS

A preferred embodiment of the invention is illustrated in the accompanying drawings, wherein:

FIGURE 3, is a partial cross section, with portions removed, taken near the center to show how the cable lifting mechanism is used to unfold the assembly;

FIGURE 4 is a partial cross section with portions removed, taken near the center to show how the cable lifting mechanism is used to lift the platform; and FIGURE 5, is a partial cross section, with portions removed, taken near the center to show how an additional portion is added and unfolded to increase the overall adjustable height.

PREFERRED EMBODIMENT

Figure 1:
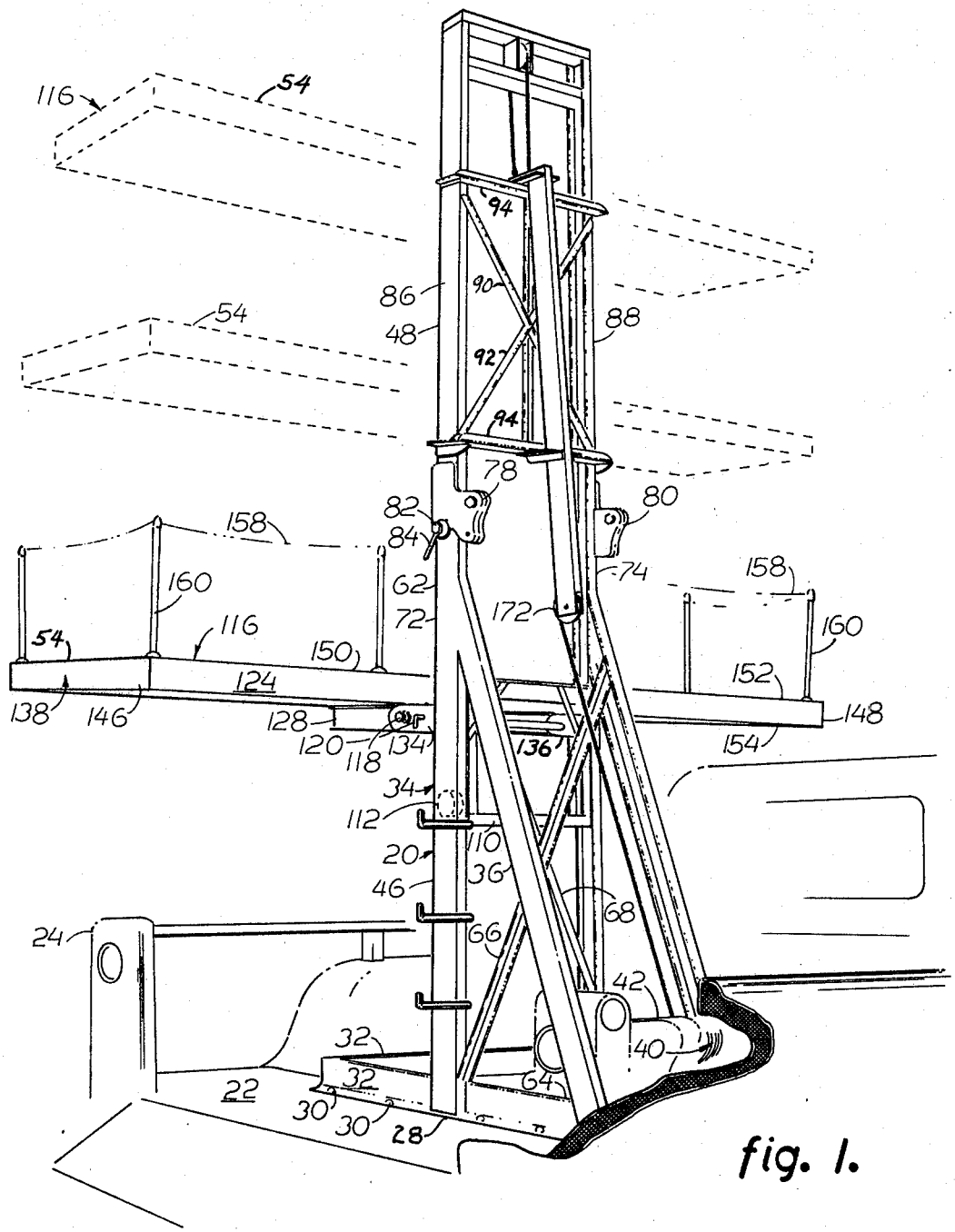
FIGURE 1 shows in perspective the foldable, adjustable height platform assembly in its unfolded operating position when mounted on a pick up truck which is partially shown. Dotted lines indicate various height positions of the platform.
Figure 2:
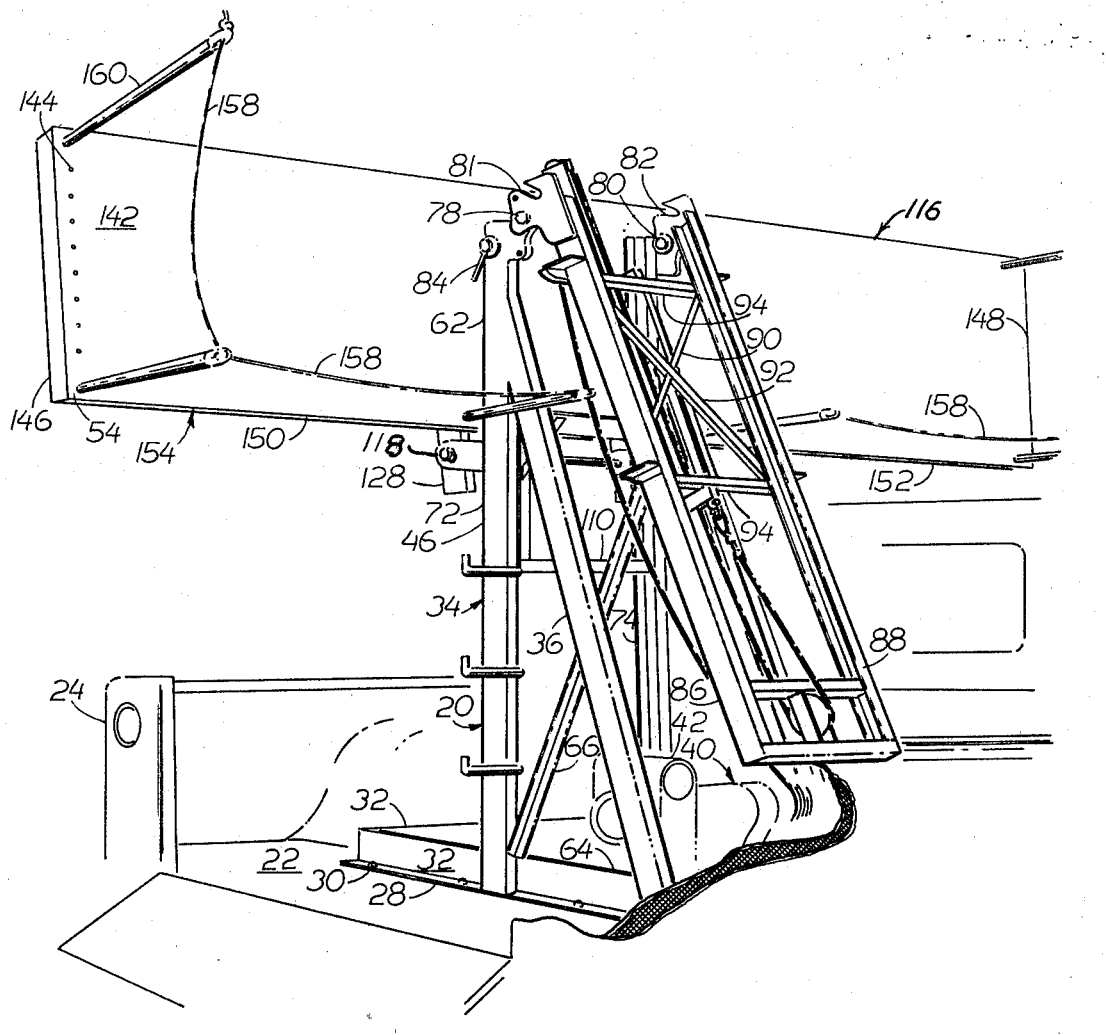
FIGURE 2, shows in perspective, the foldable adjustable height platform assembly in its folded non-operating position when mounted on a pick up truck which is partially shown.

The preferred embodiment 20 is particularly suitable for removable attachment to the load carrying structure 22 of a pick up truck 24 as illustrated in FIGURES 1 and 2.

Base

A base 28 is secured with fasteners 30 to truck structure 22. Flanges 32 are secured around base 28 to receive additional upright 34 and bracing structures 36. Within the boundary determined by flanges 32 and secured to base 28 is a cable and drum unit 40 powered by an electric motor 42. A gasoline engine, not shown, may also be used.

Uprights

In addition to FIGURES 1 and 2, FIGURES 3 and 4 indicate how upright structure 34 is constructed and moved during folding and unfolding when a stationary 46 and a foldable section 48 are pivotally joined together. In FIGURE 5, an additional foldable section 98 is shown. In each arrangement, an upright structure 34 is erected to provide a support and a guide extending to a desired height above truck 24 or ground so that a platform 54 may be raised to selective elevations along structure 34. The first portion or section 46 of upright structure 34 is mounted securely to flanges 32 and base 28 substantially midway of the base width. It is strengthened with diagonal braces 36 extending from near its top 62 down to the side 64 of base 28 and with crossed braces 66, 68 extending between left and right track members 72, 74, respectively, which comprise this first portion or section 46.

At the top of each upstanding track member 72, 74, offset pivotal bearing mounts 78, 80 are provided. In addition combined pin receivers 82 and hand operated clamps 84 are secured to upright stationary structure 46 just below and off to one side of bearing mounts.

Upright-foldable

An upper portion or foldable section 48 is pivotally secured at its slotted mounts 81, 82 by pin fasteners 84 to stationary section 46 at its pivotal bearing mounts 78, 80. When it is pivoted into an upright position and secured by clamps 84, it provides continuing respective left and right track members 86, 88. Crossed braces 90, 92 and box braces 94 are used to position and strengthen track members 86, 88. As shown in FIGURE 5, a second foldable section 98 to increase height adjustments is pivotally mounted on pins 100 and guided by receivers 102 and slots 104, and locked by clamps 106 in like manner to the securing of foldable section 48 to stationary section 46. Where two foldable sections 48 and 98 are used, upon erection, the unfolding of section 98 occurs first at the lower level where such adjustment is more readily undertaken.

Platform mounting

Once upright structure 34, whether of one or two foldable sections, is locked into its upright position, two tracks are available because all track members 72, 74, 86, 88 are made of channel shape material arranged oppositely to one another as shown in FIGURES 1 and 2. A carriage, chassis or frame 110 equipped with four wheels 112, two to a side or a respective channel track, is provided for guidance up and down upright structure 34. Then to carriage 110, a platform sub-assembly 116 is pivotally pin 118 mounted. Its angularity is lockably adjustable by clamps 120 in positions ranging from vertical to horizontal. During travel the upright position is used. In use, the horizontal position is preferred, however, some angularity of platform sub-assembly 116 with respect to the upright structure 34 is needed when ground conditions cause upright structure 34 to be tilted.

The platform sub-assembly 116 has edge framing 124, internal bracing 126 and two principal supports 128, 130 pivotally connected by pin 118 to two horizontal mounts 134, 136 of carriage 110. Over this entire framing 138, a replaceable plywood deck 142 is secured in place by fasteners 144. Across each end 146, 148 and along exposed portions 150, 152 of side 154, this platform sub-assembly 116 is equipped with a hand line 158 supported on posts 160 secured to framing 138.

Moving foldable upright sections

Moving of foldable sections which are sufficiently large and strong for many of the platform uses require utilization of powered mechanisms. A source of such powered mechanism is the electric motor 42 driven cable drum unit 40 which is secured to base 28. The application of this power is undertaken at two anchoring locations 164, 166 when one foldable section is used as illustrated in FIGURES 1 through 4. To increase the effectiveness of such cable power transmission, a centrally located offset extended arm structure 170 is secured to foldable section 48. It positions a cable pulley 172 above and to one side of the pivotal mountings 78, 80 of this section 48 when it is folded. After a cable 176 leaves drum unit 40, it is threaded through pulley 172, then along section 48, around another pulley 178 at its end, and back to anchoring fitting 164 where it is secured by "U" clamp 182 to eyelet 184, it is then ready to tilt section 48.

As electric motor 42 is operated, cable 176 is "taken in" causing a tilting or righting movement of foldable section 48 about its pivotal axis at pins 78 and 80. Soon thereafter this section 48 is upright being guided into place by receiver pins 84 and slots 81, 82. It is then clamped in this upright position using clamps 84, which are a part of the receiver pins.

Raising and lowering the platform

After upright structure 34 is completed, upon securement of foldable section 48, as illustrated in FIGURES 1 through 4, pulling end 188 of cable 176 is transferred from eyelet 184 on foldable section 48 down to eyelet 190 on platform carriage 110 upon release and fastening of "U" clamp 182. This cable drum unit 40 is reversed to obtain slack necessary to make this cable end 188 transfer possible. Then afterwards raising of platform sub-assembly 116 is undertaken by running electric motor 42 to turn cable drum unit 40 "taking in" the cable 176 once again.

I claim:
1. An adjustable height platform assembly arranged for mounting on a vehicle such as a pick up truck and for folding to reduce its height and width during travel, comprising:
    (a) a base;
    (b) multiple upright sections secured to the base, each of at least two sections pivotally secured together;
    (c) a platform sub-assembly arranged for guiding movement up and down the multiple upright sections;
    (d) a lifting mechanism, to raise and lower the platform sub-assembly and alternately connected to raise and lower the pivotable sections of the multiple upright sections, utilizing a powered drum, cable, and removable cable securement means to be selectively attached to the pivotal sections of the multiple upright sections or the platform sub-assembly; and
    (e) mid bracing on a pivotal multiple upright section having an offset extension supporting a cable pulley to receive the cable of the lifting mechanism, the cable pulley, while remaining supported on the same side of the multiple upright sections, follows a swinging path of motion during erection from a position above and offset to the pivotal mounting location of the pivotal upright sections to a position below and offset to the same pivotal mounting location.

2. An adjustable height platform assembly, as claimed in claim 1, wherein the platform sub-assembly has a platform pivotally secured to a follower means that is guided along the multiple upright sections during raising and lowering of the platform, and the platform is tilted completely next to the upright sections during travel time and occasionally it is selectively slightly tilted relative to the multiple upright sections during its use.

3. In combination with a vehicle such as a pick up truck and removably mounted on its load carrying structure, an adjustable height platform assembly foldable to reduce its height and width during travel, to meet the safety width highway requirements and to pass under overpasses, comprising:
    (a) a vehicle having load carrying structure;
    (b) a base removably secured to the load carrying structure of the vehicle;
    (c) upright track means secured below to the base and having pivotal track portions above;
    (d) a platform sub-assembly arranged for guiding movement up and down the erected upright track means having a platform pivotally secured to a follower means that is guided along the upright track means, the platform during use being positioned horizontally and occasionally because of tilting of the base the platform is slightly tilted relative to the track means into the desired horizontal position, and tilted adjacent to the track means during over road travel time to reduce the overall width of the platform assembly; and
    (e) a lifting mechanism secured to the base to raise and lower the platform sub-assembly as it is guided along the erected upright track means and alternately to pivot the pivotal track portion either upwardly into its erected position or downwardly into its folded travel position, the lifting mechanism including offset positioned mechanisms to apply tilting forces used in upwardly pivoting the pivotal track portions.

4. In the combination defined in claim 3, the lifting mechanism in turn comprising:
    (a) a powered drum;
    (b) cable;
    (c) removable cable securement means to selectively attach it either to the pivotal track section of the multiple upright sections or to the platform sub assembly; and
    (d) the offset positioned mechanisms including an offset extension on the pivotal track section supporting a cable pulley to receive the cable of the lifting mechanism, the cable pulley, during erection of the pivotal track section, following a path starting from a position above and offset to the pivotal mounting location of the pivotal upright section to the position below and offset to the same pivotal mounting location.

5. In combination with a vehicle such as a pickup truck and removably mounted on its load carrying structure, an adjustable height platform assembly foldable to reduce its height and with during travel, to meet the safety width highway requirements and to pass under overpasses, comprising:
    (a) a vehicle having load carrying structure;
    (b) a base removably secured to the load carrying structure of the vehicle;
    (c) upright track means secured below to the base and having pivotal track portions above;

(d) a platform sub-assembly arranged for guiding movement up and down the erected upright track means having a platform pivotally secured to a follower means that is guided along the upright track means, the platform during use being positioned horizontally and occasionally because of tilting of the base the platform is slightly tilted relative to the track means into the desired horizontal position, and tilted adjacent to the track means during over road travel time to reduce the overall width of the platform assembly; and (e) a lifting mechanism secured to the base to raise and lower the platform sub assembly as it is guided along the erected upright track means; and (f) a tilting mechanism secured to the base to pivot the pivotal track portion either upwardly into its erected position or downwardly into its folded travel position, the lifting mechanism including offset positioned mechanisms to apply tilting forces used in upwardly pivoting the pivotal track portions.

References Cited

UNITED STATES PATENTS

| | | | |
|---|---|---|---|
| 1,356,281 | 10/1920 | Hescock et al. | 187—9 |
| 1,381,552 | 6/1921 | Rescock | 187—9 |
| 1,626,141 | 4/1927 | Lovejoy | 187—9 |
| 2,438,791 | 3/1948 | Russell | 182—103 |
| 3,178,048 | 4/1965 | Bergman et al. | 182—103 |
| 3,283,850 | 11/1966 | Jones et al. | 182—2 |
| 3,344,885 | 10/1967 | Rasmussen | 182—145 |

FOREIGN PATENTS

| | | |
|---|---|---|
| 590,423 | 7/1947 | Great Britain. |
| 814,546 | 6/1959 | Great Britain. |

REINALDO P. MACHADO, Primary Examiner

U.S. Cl. X.R.

182—152, 63